United States Patent [19]

Noda et al.

[11] Patent Number: 5,454,670
[45] Date of Patent: Oct. 3, 1995

[54] THROW-AWAY INSERT AND FACE MILLING CUTTER

[75] Inventors: Mitsuaki Noda; Yoshikatsu Mori; Yoshiki Maeda; Naruhito Yauchi, all of Itami, Japan

[73] Assignee: Sumitomo Electric Industries, Ltd., Osaka, Japan

[21] Appl. No.: 82,839

[22] Filed: Jun. 28, 1993

[30] Foreign Application Priority Data

Jul. 1, 1992 [JP] Japan .................. 4-174157

[51] Int. Cl.⁶ ........................................ B26D 1/00
[52] U.S. Cl. ................ 407/42; 407/114; 407/116
[58] Field of Search ................ 407/42, 113, 114, 407/115, 116

[56] References Cited

U.S. PATENT DOCUMENTS

| | | | |
|---|---|---|---|
| 4,294,566 | 10/1981 | Boone | 407/114 |
| 4,597,695 | 7/1986 | Johnson | 407/114 |
| 5,007,775 | 4/1991 | Pantzar | 407/114 |
| 5,067,858 | 11/1991 | Cook | 407/114 |
| 5,096,338 | 3/1992 | Takahashi | 407/114 |
| 5,114,282 | 5/1992 | Pawlik | 407/42 |
| 5,135,337 | 8/1992 | Adamson | 407/119 |

FOREIGN PATENT DOCUMENTS 0156780 10/1985 European Pat. Off. .

*Primary Examiner*—Bruce M. Kisliuk
*Assistant Examiner*—Eileen P. Morgan
*Attorney, Agent, or Firm*—Wenderoth, Lind & Ponack

[57] ABSTRACT

A throw-away insert has four sets of cutting edges with high edge strength and which does not limit the amount which can be cut. An upper half portion of the insert has a set of cutting edges provided at each of two acute-angled corners of a parallelogram. The set of cutting edges includes a major cutting edge defined on one side of the parallelogram and a minor cutting edge defined on the other side and forming an angle of about 90° with the major cutting edge. The lower half portion of the insert has the same structure and dimensions as the upper half portion but is configured as if the upper portion were turned over and further rotated 3°–7° clockwise with respect to the upper half portion. The two sets of cutting edges on the upper half portion and the two on the lower half portion constitute four sets of cutting edges in all.

18 Claims, 8 Drawing Sheets

THROW-AWAY INSERT AND FACE MILLING CUTTER

BACKGROUND OF THE INVENTION

The present invention relates to a throw away insert for milling having a cutting angle of 90° (90° is used herein to refer to angles approximate to 90°) and a face milling cutter carrying such inserts.

Figure 13:
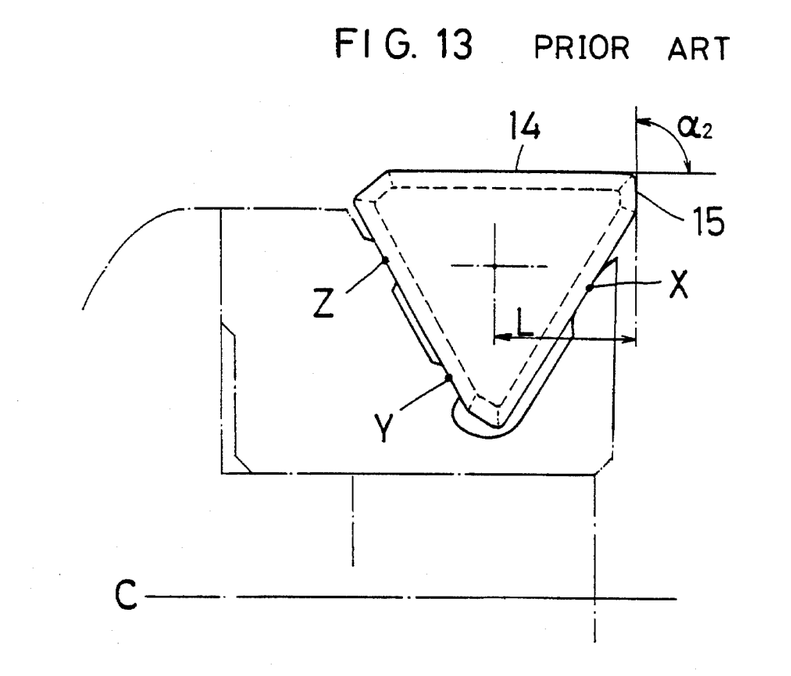
FIG. 13 is a front view of a conventional throw-away insert.
Figure 14:
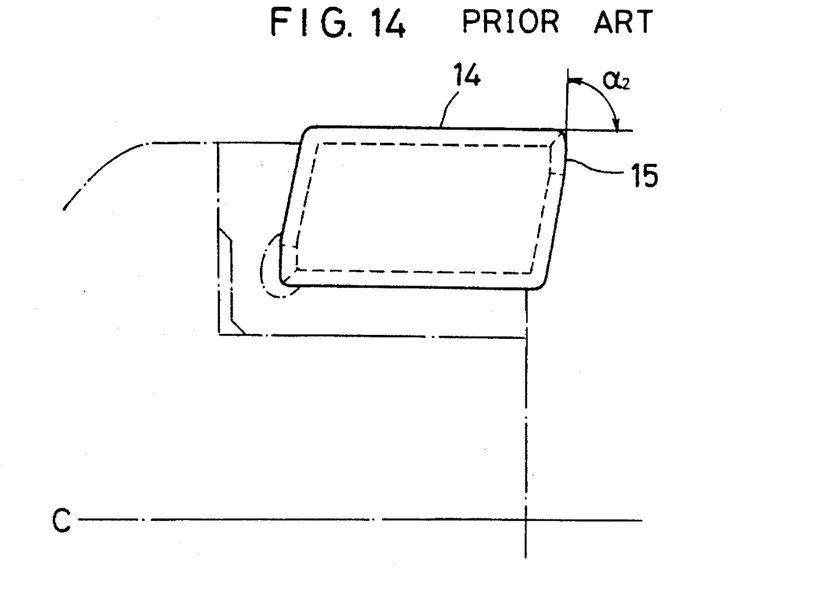
FIG. 14 is a front view of another conventional throw-away insert.
Figure 15:
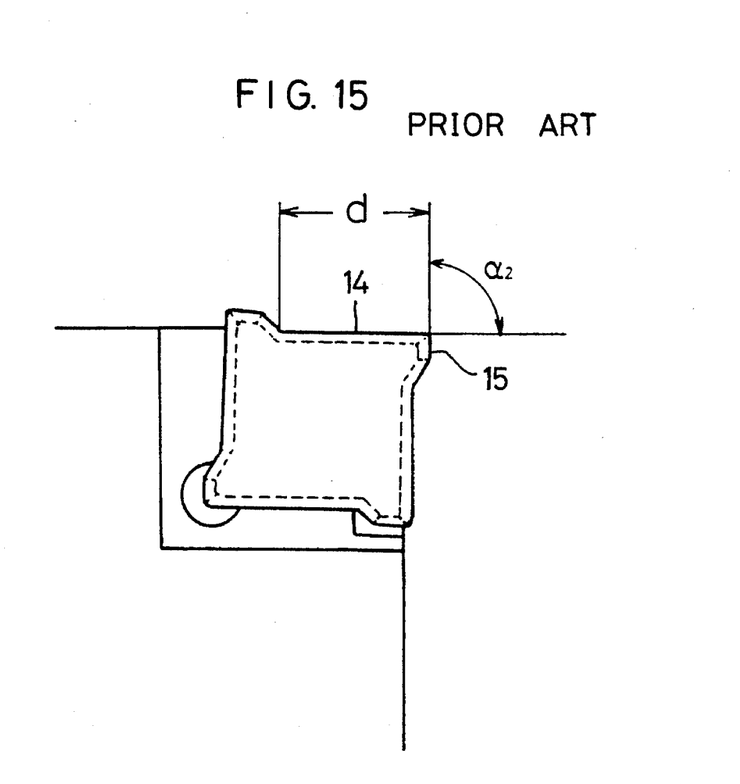
FIG. 15 is a front view of still another conventional throw-away insert.

Milling with a cutting angle of 90° (what is called corner cutting) is ordinarily carried out using throw-away inserts having a basically regular triangular shape as shown in FIG. 13 or throw-away inserts having a basically parallelogrammic shape as shown in FIG. 14. Also, as shown in FIG. 15, there is known an insert basically square in shape and having minor cutting edges protruding from the four corners (SANDVIK in Sweden).

These throw-away inserts are mounted on the outer periphery of the cutter body near its tip so that each of their major cutting edges 14 extends parallel to the axis of the cutter or is slightly inclined relative to the cutter axis in such a way that it is closer to the center of the cutter at its rear end. Cutting is done with one of the major cutting edges 14 and a minor cutting edge 15 contiguous to the major cutting edge, the corner angle α 2 therebetween being about 90° (those shown in FIGS. 13 and 14 ordinarily have a corner angle of 89° and the one shown in FIG. 15 has a corner angle several degrees still smaller). Further, since it is necessary that the cutting edges of these inserts have a positive radial rake and axial rake, their side faces have to have a relief angle. Thus, these inserts are of a positive type in which the side faces intersect the top surface as the rake face at an acute angle.

If the above-described conventional throw-away inserts, are turned over, the positions of the cutting edges are of reversed even if they are a negative type. Thus, cutting edges can be formed only on one side. This means that the numbers of cutting edge corners which can be formed on the inserts of FIGS. 14 and 13 are limited to 2 and 3, respectively.

The insert shown in FIG. 13 is used more extensively than the insert of FIG. 14 because the former has one more cutting edge corner and thus is economically advantageous. But this insert, having a basically regular triangular shape, possesses insufficient strength because its corners are thin. It is possible to increase its strength to a level comparable to other inserts by increasing the widths of the minor cutting edges 15. But wider edges 15 mean that the distance L between the center of the insert and the minor cutting edges is small. Thus, the support points X, Y and Z are arranged in an unbalanced manner, so that the insert cannot be supported stably. Thus, it is difficult to increase the strength by widening the minor cutting edges.

On the other hand, the insert of FIG. 15 has sufficiently high edge strength and has four cutting edge corners. But this insert has a major drawback in that the cutting amount is limited to d due to the interference by the adjacent minor cutting edges.

Further, since these inserts have side faces inclined (with respect to a plane perpendicular to the top surface) at an angle of 11°–20° or greater, side faces cannot be supported stably on the support surface. Thus, it is difficult to mount the cutter accurately.

Figure 16:
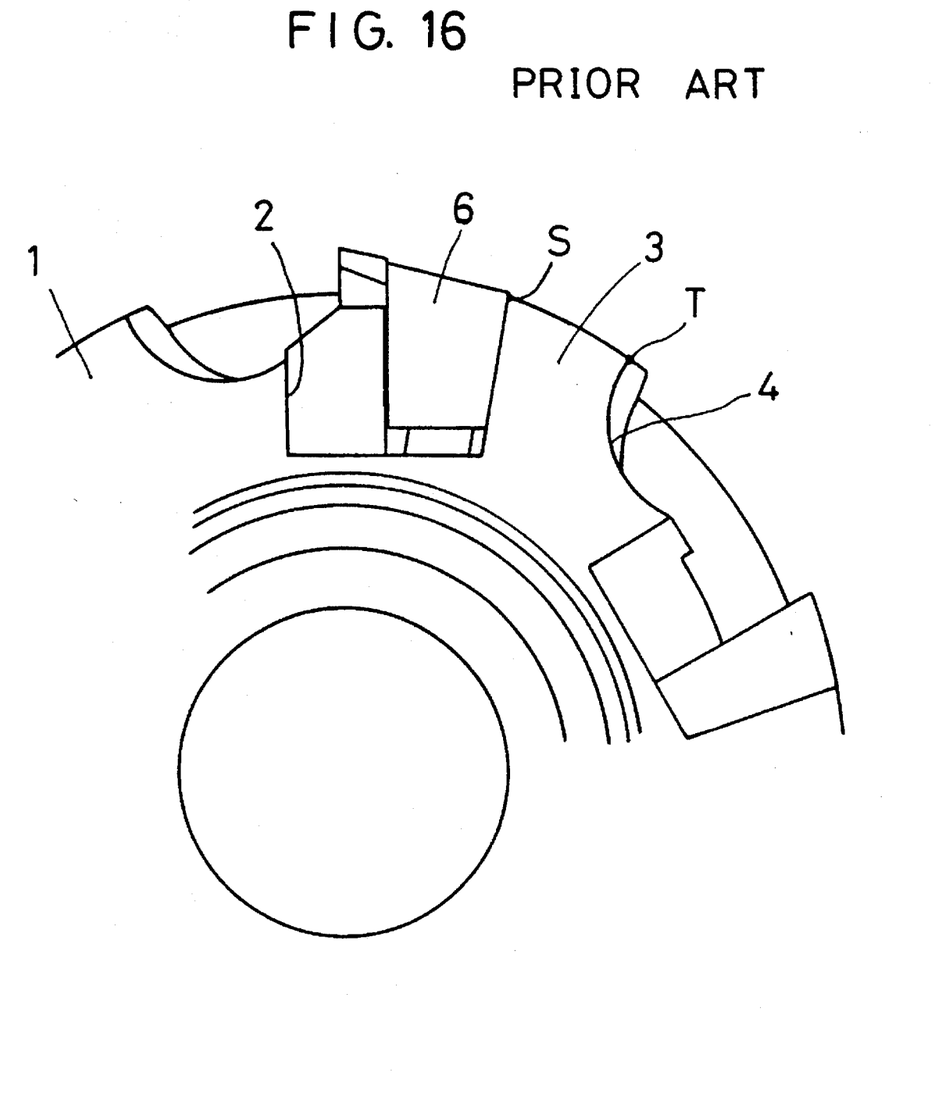
FIG. 16 is a front view of a part of a conventional face milling cutter.

A conventional face milling cutter cannot dispose of chips forcibly and thus the curling diameter of chips tends to be large. Thus, in order to curl such chips, as shown in FIG. 16, it was necessary to provide a concave chip pocket 4 in each back metal portion 3 defined between adjacent gullets 2 formed in a cutter body 1 of a conventional face milling cutter. Such pockets lower the strength of the cutter body, so that the body is more likely to be deformed. This may lead to reduced machining accuracy or chattering during cutting.

The body surface is subjected to black oxide surface treatment (coloring with caustic soda, what is referred to as a black oxide finish). But this treatment cannot sufficiently increase the corrosion resistance or the surface hardness. Thus, the body can be damaged easily by contact with chips.

SUMMARY OF THE INVENTION

It is therefore an object of the present invention to provide an economical and reliable throw-away insert having cutting edges formed at four corners thereof without decreasing the strength of cutting edges and limiting the range of cutting, and to provide a high-performance face milling cutter having a plurality of such inserts mounted thereon.

A throw-away insert for use in a face milling cutter according to the present invention comprises an upper half portion and a lower half portion which are integral with and identical in shape and dimension to each other and have a substantially parallelogrammic shape and have two cutting edges at each of the two acute-angled corners of the parallelogram, the cutting edges being arranged point-symmetrically with respect to tile center of the upper half portion and the lower half portion and each comprising a major cutting edge defined on one side of tile parallelogram and a minor cutting edge defined on the other side thereof, the minor edge forming a ridge at a position displaced outwardly from the contour of the parallelogram and contiguous to the major cutting edge, the corner angle between the major cutting edge and the minor cutting edge being substantially 90° the lower half portion being positioned with respect to the upper half portion as if then rotated over by 180° and turned clockwise as viewed from the top by 3°–7° with respect to the upper half portion, and the insert having side surfaces intersecting the top surfaces at the minor cutting edges at acute angles, respectively.

The top surface and bottom surface should have breaker grooves that are arranged in a juxtaposition with the major cutting edges, each major cutting edge excluding gradually downwardly from its one end near the minor cutting edge and at its mid-portion beginning to curve upwardly so that it becomes flush again with the top or bottom surface of the insert.

The face milling cutter according to the present invention has mounted thereon a plurality of inserts of the above-described type, each throw-away insert being mounted so that a major cutting edge is disposed on the outer periphery of the cutter and the minor cutting edge contiguous therewith is disposed on the downstream side thereof, so that each such major cutting edge is arranged parallel to the cutter axis or slightly inclined relative to the cutter axis in such a direction that it is nearer to the center of the cutter at its trailing end than at its leading end, and so that the minor cutting edge has a radial rake of −17° to −10° and the major cutting edge has an axial rake of 0 to +8°.

Especially if the throw-away inserts used have breaker grooves, it is not necessary to provide deep chip pockets in the metal back portions because the curling radius of chips can be reduced sufficiently by the breaker grooves. Thus, in order to increase the strength of the body, the outer peripheral surface of each metal back portion has such an arcuate convex shape that it is nearest to the center of the cutter at its trailing end with respect to the direction of rotation of the cutter.

Also, if a black oxide finish is not desirable, a wear-resistant, corrosion-resistant plating may be provided on the surface of the cutter body.

The throw-away insert of the present invention is characterized in that:

(1) The top and bottom surfaces are arranged such that even if the insert is turned over, the position of the cutting edges will not change. Specifically, four cutting edges each having a wide minor cutting edge and having a cutting angle of 90° are formed on diagonally opposite corners of the top and bottom surfaces. Such an insert is economically advantageous because four corners can be used for cutting and its use is not limited in the amount of cut.

(2) Since no cutting edges are formed on the obtuse-angled corners of the top and bottom surfaces, the cutting amount can be selected freely by setting the radial rake at a negative value.

(3) Since the upper and lower half portions are angularly displaced from each other by 3°–7° at a point of ½ of the thickness of the insert, positive type minor cutting edges for better cutting are combined with negative type major cutting edges For increased strength.

(4) Since the cutting edge corners protrude outwardly beyond the obtuse-angled corners of the opposite surface, cutting can be done without interference even if the side faces of the obtuse-angled corners are perpendicular to the top and bottom surfaces. The insert can be seated stably by having the side faces perpendicular.

(5) The use of inserts having breaker grooves will eliminate the necessity of providing deep chip pockets in the metal back portions because the grooves serve to reduce the curling radius of chips. Also, since each major cutting edge is arranged such that its longitudinal position is adjustable, it is possible to increase the cutting stability by controlling the thrust force during cutting (which acts to push or lift the workpiece).

Since inserts are mounted on the milling cutter of the present invention so that their radial rake and axial rake will be −17° to −10° and 0° to +8°, respectively, both major cutting edges and minor cutting edges have suitable relief angles.

Thanks to the above-described advantages, the face milling cutter according to the present invention can machine stably with high accuracy, so that it is highly durable and economically advantageous when compared with conventional cutters.

BRIEF DESCRIPTION OF THE DRAWINGS

Other features and objects of the present invention will become apparent from the following description made with reference to the accompanying drawings, in which:

FIG. 11 is an explanatory diagram showing how the axial rake and the thrust force of the main cutting edge are designed for;

DETAILED DESCRIPTION OF THE PREFERRED EMBODIMENTS

Figure 1:
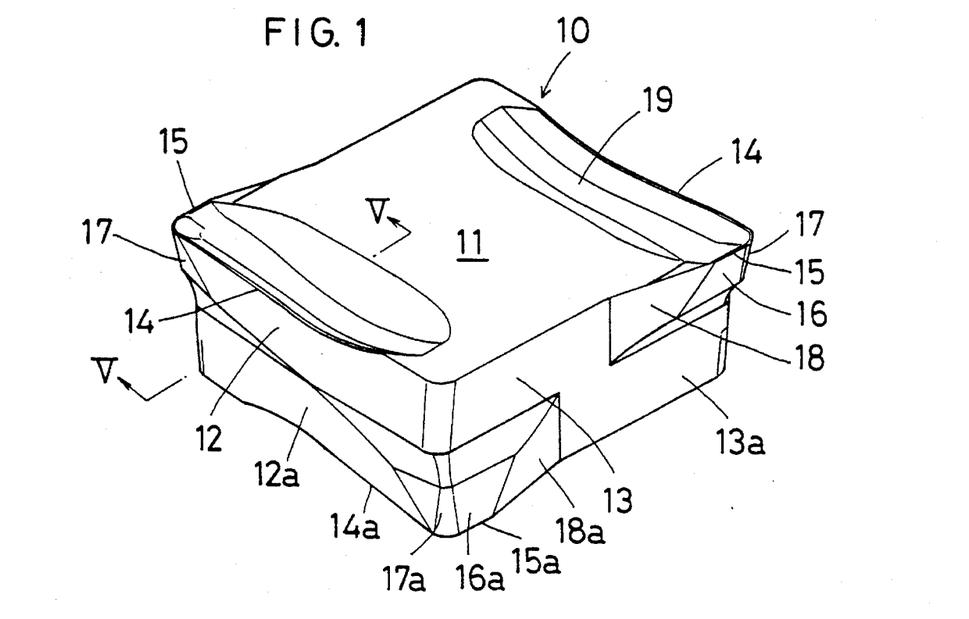
FIG. 1 is a perspective view of one embodiment of the throw-away insert of the present invention.
Figure 2:
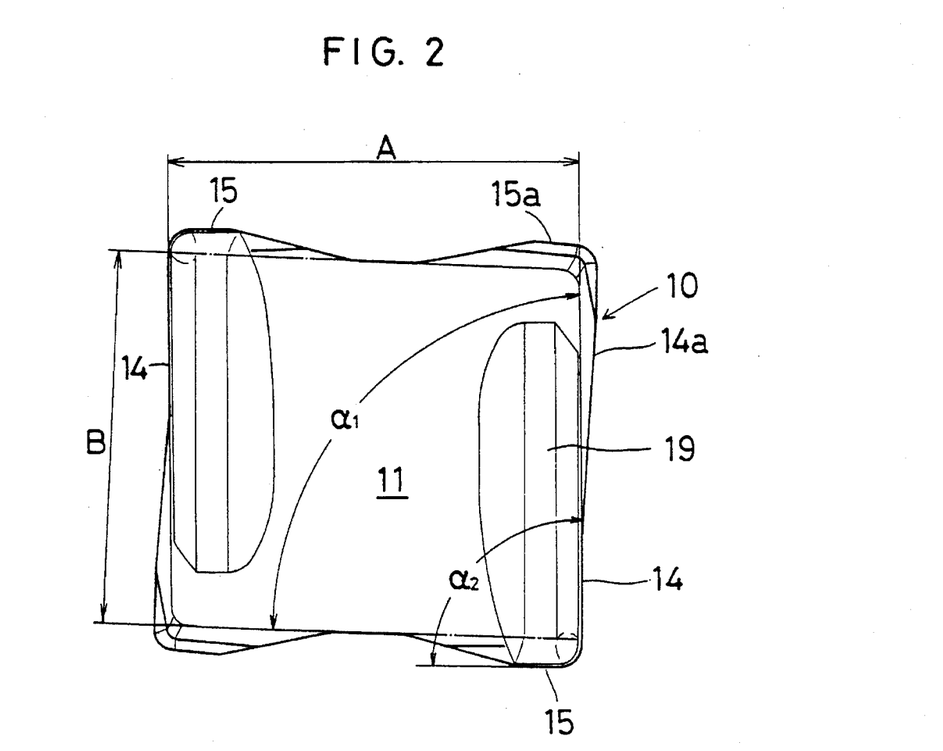
FIG. 2 is a plan view of the insert of FIG. 1.

FIGS. 1–5 show one embodiment of a throw-away insert of the present invention. This throw-away insert 10 has a top or upper surface 11 which is basically a parallelogram whose acute-angled corners have an apex angle $\alpha 1$ of 80°–88°, as shown in FIG. 2. The relation between the lengths of its sides A and B may be set at A=B, A>B or A<B.

On the top surface 11 is provided two cutting edges having a cutting angle (corner angle $\alpha 2$) of about 90° and arranged point-symmetrically with respect to the center of the top surface. Each cutting edge comprises a major cutting edge 14 defined on one (B in FIG. 2) of the two sides forming an acute corner of the parallelogram and a minor cutting edge 15 which is the edge of a several-millimeter-long ridge offset slightly outwardly from the other side and is connected at one end to the major cutting edge 14 and at the other end to a mid-point of the side A through an inwardly tapered ridge.

Figure 3:
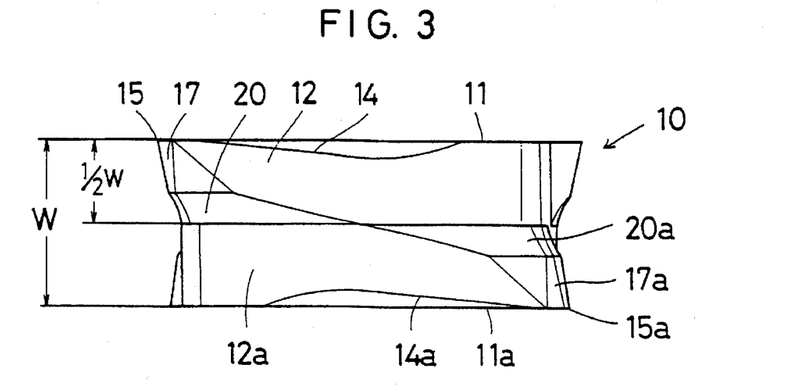
FIG. 3 is a side view of the major cutting edge side of the same.
Figure 4:
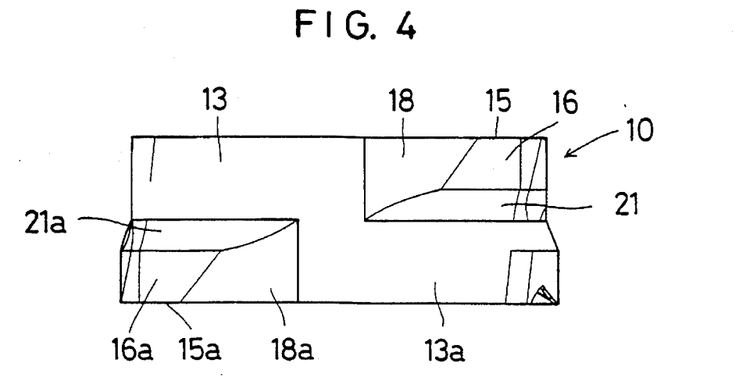
FIG. 4 is a side view of the minor cutting edge side of the same.

As shown in FIG. 3, the major cutting edge 14 gradually extends to a level below the top surface from its end contiguous to the minor cutting edge 15, and at a point near the center of the side B, it curves upwards until it returns to the same level as the top surface. The edges 14 and 15 are connected together through an arcuate portion having a small radius of curvature in the embodiment but they may be connected through a small chamfered portion.

Side faces 12 terminating at the major cutting edges 14 and side faces 13 contiguous to the side faces 12 through the obtuse-angled corners are perpendicular to the top surface 11, while side faces 16 as flanks of the minor cutting edges 15 are inclined by an angle larger than a predetermined axial rake so as to intersect the top surface 11 at an acute angle. Side faces 17 between the side faces 12 and 16 are also inclined slightly so that the corners of the cutting rakes define acute-angled edges. Side faces 13, not flush with the side faces 16, are connected to the latter through tapered surfaces 18.

Figure 5A:
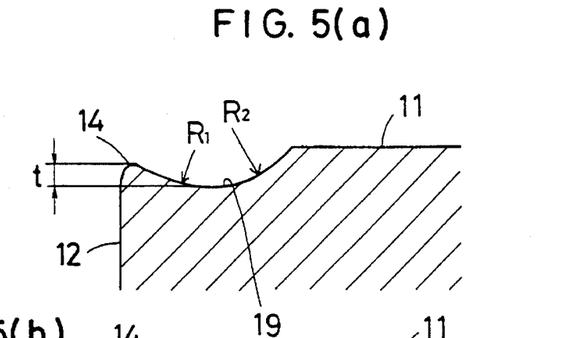
FIG. 5(a) is a sectional view taken along line V—V of FIG. 1
Figure 5B:
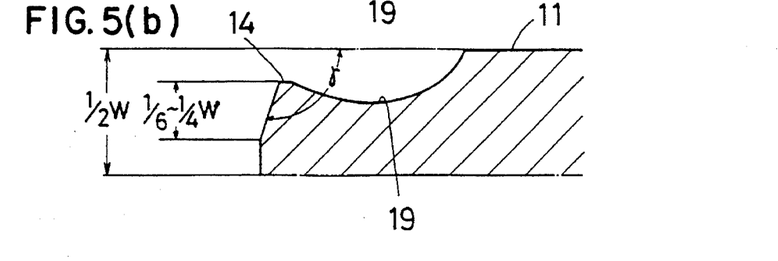
FIG. 5(b) is a sectional view of another embodiment at the same position.

As shown in FIG. 5(b), each side face 12 may have its upper portion (an area within the range of ⅙W–¼W wherein W is the thickness of the insert) tapered to provide an obtuse-angled (r=95°–100°) major cutting edge 14.

In the top surface 11 are further provided breaker grooves 19 extending side along the major cutting edges 14. The grooves 19 have a depth t (FIG. 5a) which is constant in the longitudinal direction. In the widthwise direction, the grooves 19 curve with a radius of curvature R1 from edge 14 to the deepest point and then curve upwards with a larger radius of curvature R2.

Tapered surfaces 20, 21 (FIGS. 3 and 4) may be omitted so that the bottom end portions of the side faces 16, 17 rise from the side faces 12a, 13a at a right angle at the point ½W.

Figure 6A:
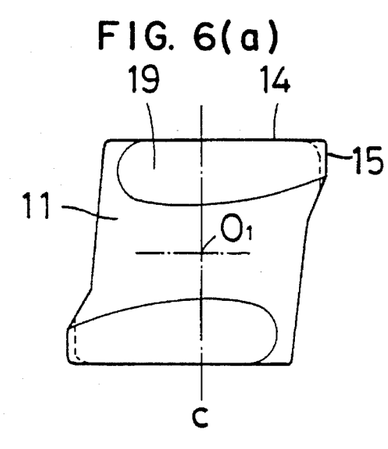
FIGS. 6(a) and 6(b) are top and bottom views of the insert, respectively.
Figure 6B:
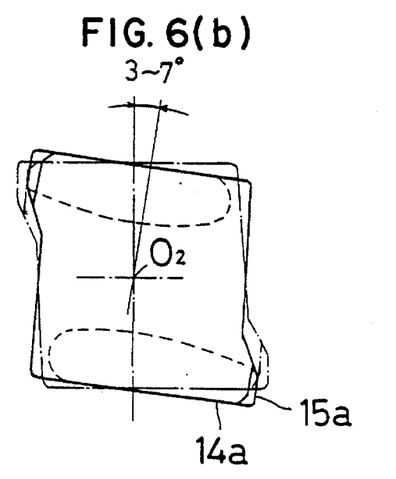

The lower half portion of the insert borders its upper half portion along the ½W line and is shaped and dimensioned identically to the upper half portion. Namely, as shown in FIGS. 6(a) and 6(b), two inserts both having the thickness of ½W are prepared. One of them which is to be the lower half portion (the one on the right in FIG. 6) is turned by 180° about its axis c with respect to the upper half and then turned clockwise in the figure by 3°–7 about the center O2 of surface. In this state, the two inserts are put one on the other and bonded together with their surface centers O1, O2 aligned with each other. The insert according to the present invention has such a structure as if made in the abovesaid manner. Since the upper and lower half portions have the same structure, the elements on the lower half which are identical to the elements on the upper half are denoted with the same numerals but with the letter a attached thereto to distinguish them from each other.

In the illustrated embodiment, side faces 13 and 13a are coplanar but they may be slightly offset from each other.

Next, a preferred embodiment of the face milling cutter according to the present invention will be described with reference to FIGS. 7–12.

Figure 7:
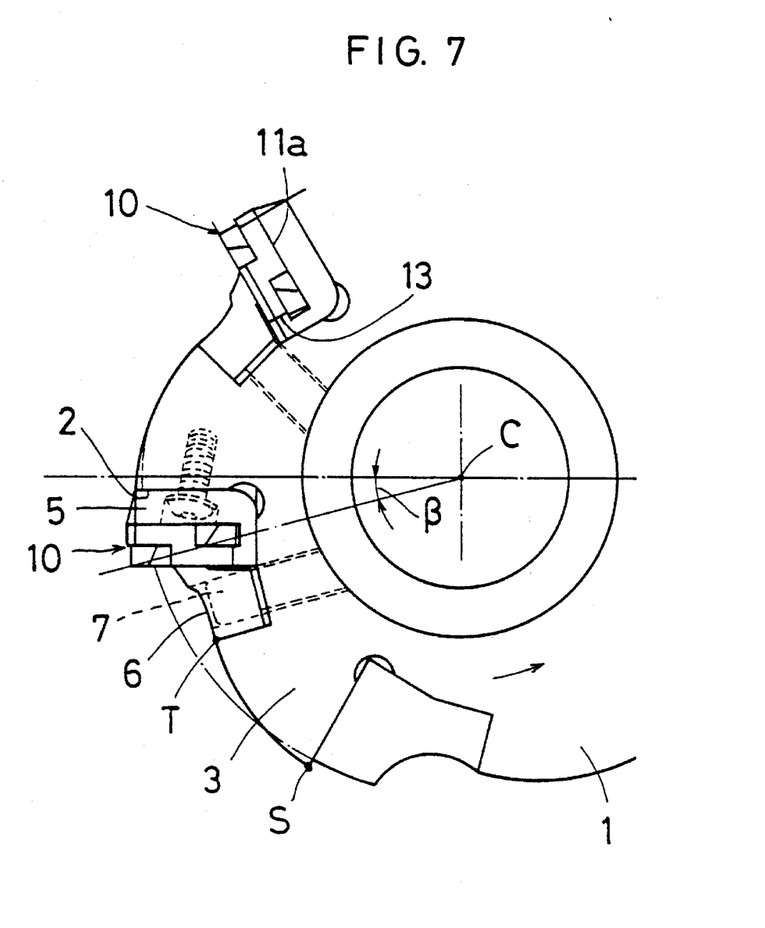
FIG. 7 is a front view of a portion of the face milling cutter of the present invention.
Figure 8:
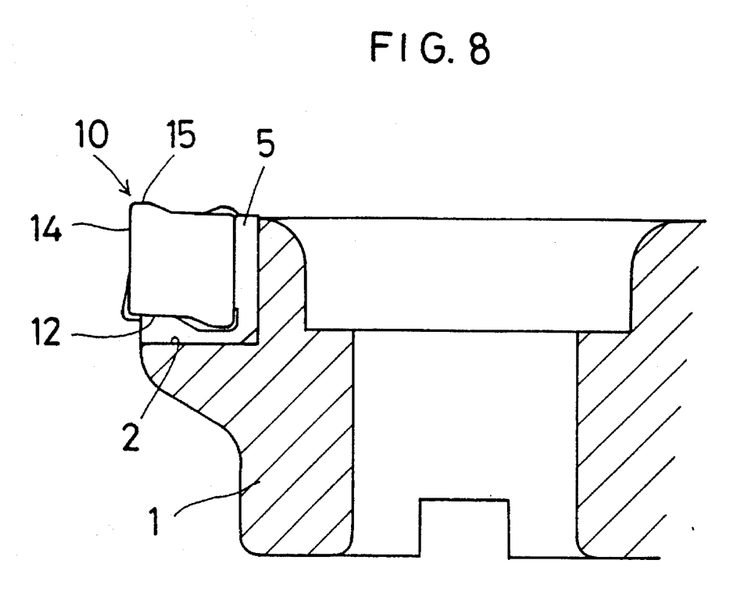
FIG. 8 is a sectional view of the same.
Figure 9:
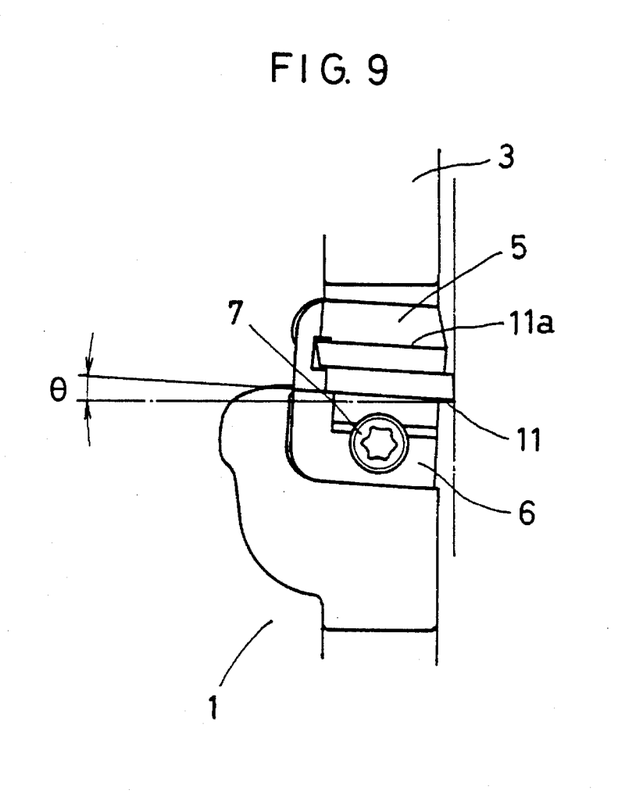
FIG. 9 is a side view of the insert mounting portion of the same.

In FIGS. 7–9, numeral 1 designates a cutter body. Gullets 2 are formed in the body along its outer edge at a predetermined pitch. Back metal portions 3 are provided between the adjacent gullets 2. A locator 5 is bolted to the rear (with respect to the direction of rotation) wall of each gullet 2. A metal presser 6 is press-fitted in a wedge-shaped groove formed in the front part (with respect to the direction of rotation) of each gullet 2. The throw-away insert 10 of the present invention is set in each gullet 2. If it is intended to use the cutting edges on the top surface, the insert is fixed in position by bringing its bottom surface 11a and side faces 12, 13 on one side into contact with the seating groove of the locator 5. Then, it is clamped to the locator 5 with the metal presser 6 by retracting the fixture 6 into the wedge-shaped groove screw 7.

In this state, the insert 10 should be positioned so that one of its major cutting edges 14 used for cutting is parallel to the axis C of the cutter or slightly inclined with respect to the axis C in such a way that its rear end is closer to the cutter than its front end. With this arrangement, the foremost end P of the cutting edges on the bottom surface is located behind the minor cutting edge 15, so that the end P will not interfere with the workpiece.

Figure 10:
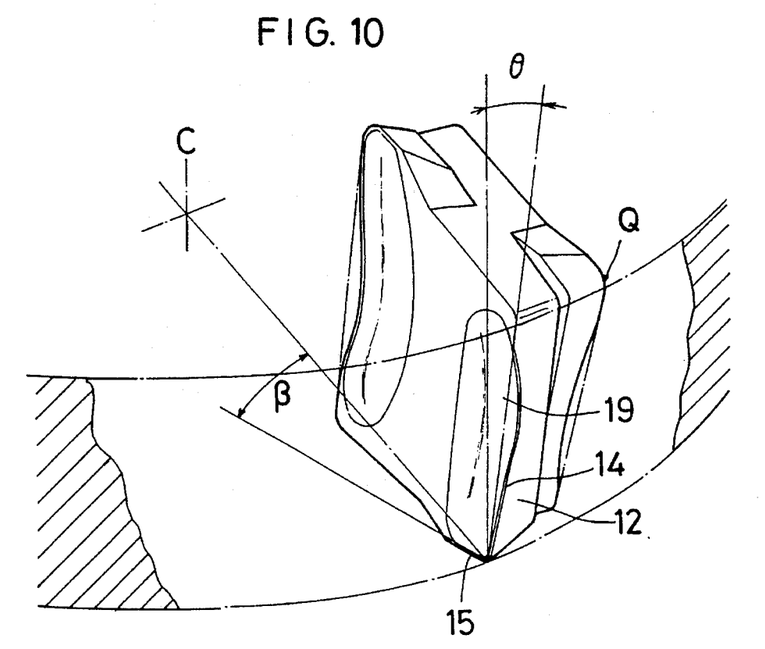
FIG. 10 is a perspective view of the same illustrating the mounting position of the insert.
Figure 11:
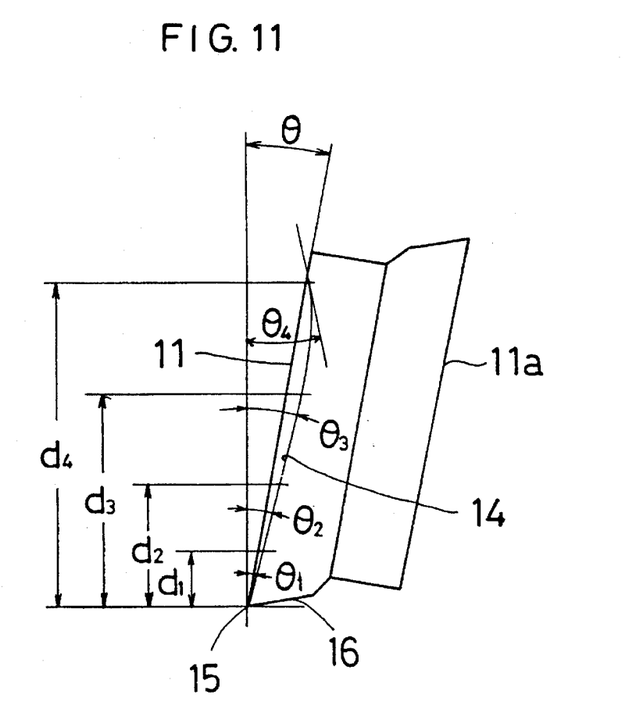
Figure 12:
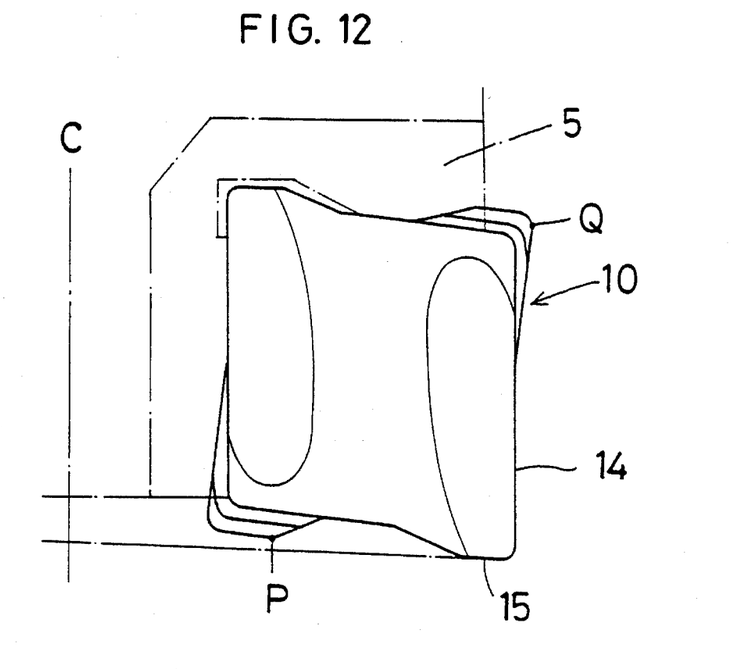
FIG. 12 is a plan view of the throw-away insert showing the insert mounting position when the radial rake is zero.

Also, as shown in FIGS. 7 and 10, the radial rake β should be set at −17° to −10° and as shown in FIGS. 9 and 11, the axial rake θ of the rake face should be set at 0° to +8°. If, β=0°, as shown in FIG. 12, the outermost end Q of the cutting edge on the bottom surface will be disposed outwardly of the rear end of the major cutting edge on the upper side. But by inclining the insert 10 by 10°–17° from the position of FIG. 10 in such a direction that its side on the left of the figure is raised, the point Q will be moved inwardly until it is located nearer to the center of the cutter than the rear end of the major cutting edge 14. In this state, the major cutting edge has a suitable relief angle, so that any portion of the insert other than the cutting edge will not interfere with the workpiece.

Further, by setting the angle θ at 0° to +8°, the minor cutting edge 14, too, has a suitable relief angle as shown in FIG. 11.

If the axial rake θ is too large, the workpiece would be lifted up by the thrust force during cutting. If it is too small, it would be pressed against the cutter with a strong force. In either case, the quality of the product or the strength of the cutting edge will be adversely influenced. As shown in FIG. 11, the major cutting edge of the insert according to the present invention has an axial rake which changes from positive to negative toward its rear end so that the thrust force can be controlled to an optimum value at any depth of cut which may change from d1 to d4. A conventional insert has a straight major cutting edge, so that the thrust force increases in proportion to the depth of cut. Thus, it was impossible to control the thrust force to an optimum value according to the depth of cut.

However, in the present invention, up to the depth d3, the work pressing Force is kept smaller than when cutting with a conventional straight major cutting edge because the axial rakes θ1–θ3 of the major cutting edge are larger than the axial rake of the rake face 11. Also, the lifting force produced when the depth of is d4 is smaller than when cutting with a conventional straight major cutting edge because part of the lifting force that acts on the workpiece is negated by the pressing force that acts on the rear end of the edge having a negative angle θ4.

Further, the back metal portions 3 of the cutter of the present invention have a unique shape not found in conventional cutters. Namely, as shown in FIG. 7, each back metal portion has its outer peripheral surface shaped as a convex arcuate surface which is tapered rearwardly (with respect to the direction of rotation) toward the center of the cutter and has no conventional concave chip-breaking pocket. With this arrangement, the thickness of each back metal portion (dimension between S–T) can be approximately doubled when compared with a conventional cutter of the same size. Thus, the rigidity of the body is high, so that the body is deformed less when the pressers 6 are press-fitted or when subjected to cutting forces. Thus, the mounting accuracy of the cutting edge improves and cutting can be done stably with less chattering. This improves the life of the inserts and the machining accuracy.

Further, the cutter body 1 is subjected to electroless plating (what is called Kanigen plating), so that its corrosion resistance and surface wear resistance are higher than conventional cutters.

What is claimed is:

1. A throw-away insert for use in a face milling cutter, said insert comprising: a upper half portion and a lower half portion which are integral with and identical in shape and dimension to each other, each of said portions including an upper surface having a substantially parallelogrammic shape so as t define two acute-angled corners, two cutting edges at the two acute-angled corners of the upper surface, respectively, and ridges at positions displaced outwardly from the center of the parallelogrammic upper surface and adjacent to said acute-angled corners, respectively, said cutting edges being disposed point-symmetrically with respect to the center of said parallelogrammic upper surface, and each of said cutting edges comprising a major cutting edge defined on one side of the parallelogrammic upper surface and a minor cutting edge defined on another other side thereof with the minor cutting edge constituting one of said ridges and being contiguous to the major cutting edge, said major cutting edge and the minor cutting edge contiguous therewith subtending an angle of substantially 90° in the plane of said upper parallelogrammic surface, said lower half portion having the configuration of said upper half portion as if said upper portion were turned over about an axis extending through the center of the upper surface thereof perpendicularly to said one side of the upper surface and then rotated by 3°–7° about an axis extending normal to said upper surface through the center of said upper surface, and said insert having side surfaces intersecting said upper surfaces at said minor cutting edges, respectively, at an acute angle.

2. A throw-away insert as claimed in claim 1, wherein said upper half portion and said lower half portion have breaker grooves juxtaposed with said major cutting edges, each said major cutting edge extending, from one end thereof near the minor cutting edge contiguous therewith, gradually downwardly relative to the upper surface and having a mid-portion at which the major cutting edge begins to curve upwardly until it becomes flush again with the upper surface.

3. A face milling cutter comprising: a rotatable cutter body having a plurality of gullets in the outer periphery thereof and a plurality of throw-away inserts, each of said throw-away inserts comprising an upper half portion and a lower half portion which are integral with and identical in shape and dimension to each other, each of said portions including an upper surface having a substantially parallelogrammic shape so as to define two acute-angled corners, two cutting edges at the two acute-angled corners of the upper surface, respectively, and ridges at positions displaced outwardly from the center of the parallelogrammic upper surface and adjacent to said acute-angled corners, respectively, said cutting edges being disposed point-symmetrically with respect to the center of said parallelogrammic upper surface, and each of said cutting edges comprising a major cutting edge defined on one side of the parallelogrammic upper surface and a minor cutting edge defined on another other side thereof with the minor cutting edge constituting a said ridge and being contiguous to the major cutting edge, said major cutting edge and the minor cutting edge contiguous therewith subtending an angle of substantially 90° in the plane of said upper parallelogrammic surface, said lower half portion having the configuration of said upper half portion as if said upper portion were turned over about an axis extending through the center of the upper surface thereof perpendicularly to said one side of the upper surface and then rotated by 3°–7° about an axis extending normally to said upper surface through the center of said upper surface, and each said insert having side surfaces intersecting said upper surfaces thereof at said minor cutting edges, respectively, at an acute angle, and said inserts being mounted in said gullets, respectively, with a respective said major cutting edge of each of said inserts being disposed on the outer periphery of the cutter body and the minor cutting contiguous with the respective major cutting edge being disposed downstream of the respective major cutting edge with respect to a direction of rotation of the cutter body, each said respective major cutting edge extending parallel to the axis of rotation of said cutter body, and each said minor cutting edge contiguous with said respective major cutting edge having a radial rake of −17° to −10° and said respective major cutting edge having an axial rake of 0° to +8°.

4. A face milling cutter as claimed in claim 3, wherein said cutter body has metal back portions defined between said gullets, each of said back portions having an outer peripheral surface of an arcuate convex shape that is located nearer to the axis of the cutter at its upstream end, with respect to the direction of rotation of the cutter, than at its downstream end.

5. A face milling cutter as claimed in claim 4, and further comprising a plating layer disposed on the surface of the cutter body to increase the wear resistance and the corrosion resistance of the cutter body.

6. A face milling cutter as claimed in claim 3, and further comprising a plating layer disposed on the surface of the cutter body to increase the wear resistance and the corrosion resistance of the cutter body.

7. A face milling cutter as claimed in claim 3, wherein the upper half portion and the lower half portion of each of said inserts have breaker grooves juxtaposed with said major cutting edges, each said major cutting edge extending, from one end thereof near the minor cutting edge contiguous therewith, gradually downwardly relative to the upper surface and having a mid-portion at which the major cutting edge begins to curve upwardly until it becomes flush again with the upper surface.

8. A face milling cutter as claimed in claim 7, wherein the upper half portion and the lower half portion of each of said inserts have breaker grooves juxtaposed with said major cutting edges, each major cutting edge extending, from one end thereof near the minor cutting edge contiguous therewith, gradually downwardly relative to the upper surface and having a mid-portion at which the major cutting edge begins to curve upwardly until it becomes flush again with the upper surface.

9. A face milling cutter as claimed in claim 8, and further comprising a plating layer disposed on the surface of the cutter body to increase the wear resistance and the corrosion resistance of the cutter body.

10. A face milling cutter as claimed in claim 7, and further comprising a plating layer disposed on the surface of the cutter body to increase the wear resistance and the corrosion resistance of the cutter body.

11. A face milling cutter comprising: a rotatable cutter body having a plurality of gullets in the outer periphery thereof and a plurality of throw-away inserts, each of said throw-away inserts comprising an upper half portion and a lower half portion which are integral with and identical in shape and dimension to each other, each of said portions including an upper surface having a substantially parallelogrammic shape so as to define two acute-angled corners, two cutting edges at the two acute-angled corners of the upper surface, respectively, and ridges at positions displaced outwardly from the center of the parallelogrammic upper surface and adjacent to said acute-angled corners, respectively, said cutting edges being disposed point-symmetrically with respect to the center of said parallelogrammic upper surface, and each of said cutting edges comprising a major cutting edge defined on one side of the parallelogrammic upper surface and a minor cutting edge defined on another other side thereof with the minor cutting edge constituting a said ridge and being contiguous to the major cutting edge, said major cutting edge and the minor cutting edge contiguous therewith subtending an angle of substantially 90° in the plane of said upper parallelogrammic surface, said lower half portion having the configuration of said upper half portion as if said upper portion were turned over about an axis extending through the center of the upper surface thereof perpendicularly to said one side of the upper surface and then rotated by 3°–7° about an axis extending normally to said upper surface through the center of said upper surface, and each said insert having side surfaces intersecting said upper surfaces thereof at said minor cutting edges, respectively, at an acute angle, and said inserts being mounted in said gullets, respectively, with a respective said major cutting edge of each of said inserts being disposed on the outer periphery of the cutter body and the minor cutting contiguous with the respective major cutting edge being disposed downstream of the respective major cutting edge with respect to a direction of rotation of the cutter body, each said respective major cutting edge being slightly inclined relative to said axis of rotation in such a direction that a trailing end thereof with respect to said direction of rotation is closer to said axis than a leading end thereof, and each said minor cutting edge contiguous with said respective major cutting edge having a radial rake of $-17°$ to $-10°$ and said respective major cutting edge having an axial rake of $0°$ to $+8°$.

12. A face milling cutter as claimed in claim 11, wherein said cutter body has metal back portions defined between said gullets, each of said back portions having an outer peripheral surface of an arcuate convex shape that is located nearer to the axis of the cutter at its upstream end, with respect to the direction of rotation of the cutter, than at its downstream end.

13. A face milling cutter as claimed in claim 12, and further comprising a plating layer disposed on the surface of the cutter body to increase the wear resistance and the corrosion resistance of the cutter body.

14. A face milling cutter as claimed in claim 11, and further comprising a plating layer disposed on the surface of the cutter body-to increase the wear resistance and the corrosion resistance of the cutter body.

15. A face milling cutter as claimed in claim 11, wherein the upper half portion and the lower half portion of each of said inserts have breaker grooves juxtaposed with said major cutting edges, each said major cutting edge extending, from one end thereof near the minor cutting edge contiguous therewith, gradually downwardly relative to the upper surface and having a mid-portion at which the major cutting edge begins to curve upwardly until it becomes flush again with the upper surface.

16. A face milling cutter as claimed in claim 15, wherein said cutter body has metal back portions defined between said gullets, each of said back portions having an outer peripheral surface of an arcuate convex shape that is located nearer to the axis of the cutter at its upstream end, with respect to the direction of rotation of the cutter, than at its downstream end.

17. A face milling cutter as claimed in claim 16, and further comprising a plating layer disposed on the surface of the cutter body to increase the wear resistance and the corrosion resistance of the cutter body.

18. A face milling cutter as claimed in claim 15, and further comprising a plating layer disposed on the surface of the cutter body to increase the wear resistance and the corrosion resistance of the cutter body.

* * * * *